*(12)* United States Patent
Celebi et al.

(10) Patent No.: US 7,956,807 B1
(45) Date of Patent: Jun. 7, 2011

(54) COGNITIVE POSITIONING SYSTEM

(75) Inventors: Hasari Celebi, Tampa, FL (US);
Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 22 days.

(21) Appl. No.: 12/018,509

(22) Filed: Jan. 23, 2008

Related U.S. Application Data

(60) Provisional application No. 60/881,945, filed on Jan. 23, 2007.

(51) Int. Cl.
*G01S 3/02* (2006.01)
(52) U.S. Cl. ...................................................... 342/450
(58) Field of Classification Search .................. 342/450, 342/452, 453, 357.02, 357.25; 455/448, 455/456.1, 456.2
See application file for complete search history.

(56) References Cited

U.S. PATENT DOCUMENTS

| 6,553,060 | B2 | 4/2003 | Souissi et al. | |
| 7,072,669 | B1* | 7/2006 | Duckworth | 455/456.1 |
| 2006/0083205 | A1 | 4/2006 | Buddhikot et al. | |
| 2007/0087756 | A1* | 4/2007 | Hoffberg | 455/450 |
| 2008/0176583 | A1* | 7/2008 | Brachet et al. | 455/456.3 |
| 2009/0011774 | A1* | 1/2009 | Shan et al. | 455/456.1 |

FOREIGN PATENT DOCUMENTS

WO 0035271 A1 6/2000

OTHER PUBLICATIONS

Scott Seidel and Robert Breinig. 2005. "Autonomous Dynamic Spectrum Accesss System Behavior and Performance." IEEE. International Symposium on New Frontiers in Dynamic Spectrum Access Networks. pp. 180-183. 2005.
Milind M. Buddhikot and Kevin Ryan. 2005. "Spectrum Management in Coordinated Dynamic Spectrum Access Based Cellular Networks." IEEE. International Symposium on New Frontiers in Dynamic Spectrum Access Networks. pp. 299-307. 2005.
Kalyanasundaram, Bala, Pruhs, and Kirk. 2000. "Dynamic Spectrum Allocation Algorithms." Nov. 30, 2000.
Xin, Xie, and Shen "A Novel layered graph model for topology formation and routing in dynamic spectrum access network." Journal: 2005 1st IEEE International Symposium on New Frontiers in Dynamic Spectrum Access Networks pp. 308-317.
H. Celebi and H. Arslan. 2007. "Utilization of location information in cognitive wireless networks," IEEE Wireless Commun. Mag. special issue on cognitive wireless networks. Aug. 2007.
H. Arslan. 2007. "Cognitive Radio, Software Defined Radio, and Adaptive Wireless Systems." Springer. Jun. 2007.
H. Arslan and S. Yarkan. "Exploiting location awareness towards improved wireless system design in cognitive radio." IEEE Commun. Mag. 2007.

(Continued)

*Primary Examiner* — Dao L Phan
(74) *Attorney, Agent, or Firm* — Courtney M. Dunn; Smith & Hopen, P.A.

(57) ABSTRACT

This invention provides arbitrary positioning accuracy for cognitive radio communications in both indoor and outdoor environments adaptively. It enables the user or wireless device itself to adjust positioning accuracy adaptively. Hence, this invention can be used for developing numerous personal, commercial, governmental and military cognitive location-based services and applications. Furthermore, the invented H-DSM technique can be used by cognitive wireless networks and devices to improve spectrum efficiency.

40 Claims, 6 Drawing Sheets

OTHER PUBLICATIONS

M. Vossiek, L. Wiebking, P. Gulden, J. Wieghardt, C. Hoffmann, P. Heide, S. Technol, and G. Munich. 2003. "Wireless local positioning." IEEE Microwave Mag., vol. 4. No. 4. pp. 77-86. 2003.

"Federal Communications Commission (FCC) 911 Services." 2006. http://www.fcc.gov/911/enhanced.

"StarFire: A Global High Accuracy Differential GPS System." 2006. http://www.navcomtech.com.

"A Taxonomy of Indoor and Outdoor Positioning Techniques for Mobile Location Services." 2003. www.acm.org.

F. Van Diggelen. 2002. "Indoor GPS theory & implementation." IEEE Position, Location and Navigation Symposium. Apr. 2002. pp. 240-247.

"Geolocation Development Document." 2006. http://www.ieee802.org/22/.

C. Fretzagias and M. Papadopouli. 2004. "Cooperative location-sensing for wireless networks." IEEE Pervasive Computing and Communications. Mar. 2004. pp. 121-131.

H. Celebi, I. Guvenc, and H. Arslan. 2006. "On the statistics of channel models for UWB ranging." IEEE Sarnoff Symposium. Mar. 2006.

Y. Qi and H. Kobayashi. 2003. "On relation among time delay and signal strength based geolocation methods." IEEE Globecom. vol. 7. Dec. 2003. pp. 4079-4083.

B. Fette. 2006. Cognitive Radio Technology. Newnes. 2006.

S. Gezici, Z. Tian, G. B. Giannakis, H. Kobayashi, A. F. Molisch, H. V. Poor, and Z. Sahinoglu. 2005. "Localization via UWB radios." IEEE Signal Processing Mag. vol. 22. No. 4. pp. 70-84. Jul. 2005.

Y. Xing, R. Chandramouli, S. Mangold, and S. Shankar. 2006. "Dynamic spectrum access in open spectrum wireless networks." IEEE. J. Sel. Areas Commun. vol. 24. No. 3. pp. 626-637. Mar. 2006.

"IEEE 1900 Standards Committee on Next Generation Radio and Spectrum Management." 2006. http://www.ieeep1900.org/.

J. O. Neel. 2006. "Analysis and design of cognitive radio networks and distributed radio resource management algorithms." 2006. Ph.D. dissertation. Virginia Polytechnic Institute and State University. VA. Sep. 2006.

J. Hightower and G. Borriello. 2001. "A survey and taxonomy of location systems for ubiquitous computing." University of Washington. Tech. Rep. 2001.

I. Guvenc and Z. Sahinoglu. 2005. "TOA estimation with different IR-UWB transceiver types." IEEE Int. Conf. UWB (ICU). Sep. 2005. pp. 426-431.

W. Lehr and J. Crowcroft. 2005. "Managing shared access to a spectrum commons." First IEEE Symposium on New Frontiers in Dynamic Spectrum Access Networks. Nov. 2005. pp. 420-444.

"Dynamic Spectrum Sharing." 2006. http://www.sharedspectrum.com/?section=presentations.

D. Willkomm, J. Gross, and A. Wolisz. 2005. "Reliable link maintenance in cognitive radio systems." First IEEE International Symposium on Dynamic Spectrum Access Networks. DySPAN. Nov. 2005. pp. 371-378.

B. Kim, N. K. Shankaranarayanan, P. S. Henry, K. Schlosser, and T. K. Fong. 1999. "The AT&T Labs broadband fixed wireless field experiment." IEEE Communications Magazine. vol. 37. No. 10. pp. 56-62. 1999.

K. Sheikh, D. Gesbert, D. Gore, and A. Paulraj. "Smart antennas for broadband wireless access networks." 1999. IEEE Commun. Mag. vol. 37. No. 11. pp. 100-105. 1999.

P. Grover, R. Agarwal, and A. K. Chaturvedi. 2004. "Geolocation using transmit and receive diversity." IEEE Globecom. vol. 6. Dec. 2004. pp. 3681-3684.

B. H. Fleury and P. E. Leuthold. 1996. "Radiowave propagation on mobile communications: an overview of European research." IEEE Commun. Mag. vol. 34. No. 2. pp. 70-81. 1996.

D. Landi and C. Fischer. 2004. "The effects of UWB interference on GSM systems." International Zurich Seminar on Communications. Feb. 2004. pp. 86-89.

H. H. Nagel. 2004. "Steps towards a cognitive vision system." Artificial Intelligence Mag. vol. 25. No. 2. pp. 31-50. 2004.

J. Hightower and G. Borriello. 2001. "Location sensing techniques." IEEE Computer. vol. 34. No. 8. pp. 57-66. 2001.

J. Smith, C. Salthouse, and N. Gershenfeld. "Code-division multiplexing of a sensor channel: a software implementation." IEEE. J. Sel. Areas Commun. vol. 17. No. 4. pp. 725-731. 1999.

H. Arslan and M. E. Sahin. 2006. "Cognitive UWB-OFDM: pushing ultrawideband beyond its limit via opportunistic spectrum usage." J. Commun. and Networks. special issue on spectrum resource optimization. vol. 8. pp. 151-157. Jun. 2006.

A. F. Molisch. 2005. "Ultrawideband propagation channels-theory, measurement, and modeling." IEEE. Trans. Veh. Technol. vol. 54. No. 5. pp. 1528-1545. Sep. 2005.

R. Giuliano and F. Mazzenga. 2005. "Performance evaluation of UWB sensor network with Aloha multiple access scheme." International Workshop on Wireless Ad Hoc Networks. May 2005.

A. F. Molisch, K. Balakrishnan, D. Cassioli, C. C. Chong, S. Emami, A. Fort, J. Karedal, J. Kunisch, H. Schantz, U. Schuster, and K. Siwiak. 2005. "IEEE 802.15.4a Channel Model—Final Report." tech. rep. doc: IEEE 802.15-04-0662-02-004a. 2005. http://www.ieee802.org/15/pub/TG4a.html.

A. Alvarez, G. Valera, M. Lobeira, R. Torres, and J. Garcia. 2003. "New channel impulse response model for UWB indoor system simulations." IEEE. Vehic. Techn. Conf.-Fall. vol. 1. 2003. pp. 1-5.

J. Kunisch and J. Pamp. "Measurement results and modeling aspects for the UWB radio channel." IEEE. Conference on Ultra Wideband Systems and Technologies. 2002. pp. 19-23.

M. Mclure, R. C. Qiu, and L. Carin. 1997. "On the super resolution identification of observables from swept-frequency scattering data." IEEE. Trans. Antennas Propagat. vol. 45. No. 4. pp. 631-641. 1997. Systems and Technologies. 2002. pp. 19-23.

H. Arslan and H. Celebi. 2007. "Location information management systems for cognitive wireless networks." Book Chapter. Cognitive radio, software defined radio, and adaptive wireless systems. Springer. Jan. 2007.

H. Arslan and H. Celebi. 2007. "Software defined radio architectures for cognitive radios." Book chapter. Cognitive radio, software defined radio, and adaptive wireless systems. Springer. Jan. 2007.

"Hessian Matrix." 2006. http://mathworld.wolfram.com/Hessian.html.

Clancy III, Thomas Charles. 2006. "Dynamic spectrum access on cognitive radio networks." pp. 1-106. 2006.

Ian F. Akyildiz, Won-Yeol Lee, Mehmet C. Vuran, Shantidev Mohanty. 2006. "NeXt generation/dynamic spectrum access/cognitive radio wireless networks: A survey." Computer Networks 50. pp. 2127-2159.

H. Meyer, M. Moeneclaey, and S. A. Fechtel. 1998. "Digital Communication Receivers: Synchronization, Channel Estimation and Signal Processing." John Wiley and Sons. pp. 329-333.

* cited by examiner

COGNITIVE POSITIONING SYSTEM

CROSS-REFERENCE TO RELATED APPLICATIONS

This application claims priority to U.S. Provisional Patent Application No. 60/881,945, entitled: "Adaptive Positioning System for Cognitive Radios," filed Jan. 23, 2007.

FIELD OF INVENTION

This invention relates to positioning systems, and more specifically to adaptive positioning systems for cognitive radios.

BACKGROUND OF THE INVENTION

Location awareness is one of the fundamental characteristics of cognitive radio (CR) technology. Realization of location awareness requires incorporation of a location information management system into cognitive radios and/or networks. In [1], a system model for location information management in cognitive wireless networks is introduced and it is extended and referred as location awareness engine in [2]. Both [1], [2] provide numerous application of location awareness in cognitive radios as well as wireless networks. These applications are fourfold; location-based services (LBSs), location-assisted network optimization, environment characterization [3], and transceiver algorithm optimization. Various detailed applications for each of these four categories are provided in [1]-[3].

Applications of location awareness can require different level of positioning accuracy. For instance, generally, indoor positioning systems demand higher precision accuracy compared to outdoor positioning systems. More specifically, asset management in industrial areas, which is a local positioning application, can require typically 0.05-30 m accuracy depending on the specific applications [4]. On the other hand, E911 services require 50-300 m accuracy in most cases [5]. For instance, when a CR device is located in the outdoor environment (e.g. in a public park), CR can adjust its accuracy level to 100 m to satisfy E911 services requirements in the United States. In this case, it can be assumed that the current waveform of the CR is GSM and the CR user leaves from the park to home. After entering to the home, the CR device recognizes the WLAN network at home using its interoperability capability and it switches its waveform to WLAN. Consequently, it can improve its positioning accuracy (e.g. 5 m) since it operates in the indoor environment. In order to support different location awareness based applications using CRs, an adaptive positioning system that can achieve accuracy adaptation in both indoor and outdoor environments is required.

To the best of inventors' knowledge, there is no solid study in the literature on the evaluation and comparison of the existing positioning technologies (e.g. GPS, UWB positioning) in the light of realization of location awareness in CRs. This issue is a current research topic since the accuracy and complexity of the employed positioning technique can affect the performance of the location awareness related applications. However, in this specification, a brief discussion on some of the existing positioning technologies such as GPS and UWB positioning is provided. There are different forms of GPS technology; standard GPS (4-20 m accuracy), Code-Phase GPS (3-6 m accuracy), Carrier-Phase GPS (3-4 mm accuracy), Differential GPS (sub-decimeter) [6], Assisted-GPS (less than 10 m accuracy) [7], Indoor GPS [8], and Software GPS [9]. As it can be seen that each of these GPS technologies provides a different level of accuracy. Even combining these different forms of GPS in a single device to provide switched accuracy level (not adaptive) is impractical and costly. However, software GPS is a promising method to switch between different GPS forms. But, eventually, this approach will only provide a set of fixed accuracy levels that are provided by each form of GPS. Basically, the existing GPS technologies do not have a capability to achieve accuracy adaptation. Moreover, GPS is not a low-cost and low-power solution [10] for some wireless networks (e.g. wireless sensor networks) where the cost and power are the major concerns.

Another alternative technology is UWB positioning, which has the capability to provide centimeter ranging accuracy due to the use of large bandwidth during the transmission [11]. However, this technology does not have a capability to achieve accuracy adaptation either. Moreover, this technology provides such fixed and high-precision positioning accuracy within only short ranges. In [12], a hybrid distance estimation technique for a legacy positioning system that is based on time-of arrival (TOA) and signal strength methods is disclosed. The technique provides flexibility to improve the accuracy using a priori distance information rather than achieving accuracy adaptation.

The details of the existing location estimation (e.g. triangulation, proximity) and sensing (e.g. scene analysis) techniques in CR context are presented in [2]. Moreover, the details of some specific location estimation techniques such as TOA for CRs are provided in [13]. However, according to [2], legacy positioning techniques without enhancements do not provide the required cognition capability that a CR demands. As a result, deficiencies of the existing legacy positioning systems in terms of providing cognition features such as accuracy adaptation in our case motivate us to develop a cognitive positioning system (CPS). TOA, signal strength, and angle-of-arrival (AOA) legacy location estimation techniques can be considered as candidates for the disclosed CPS, if they can be enhanced with cognition capabilities. AOA techniques are mostly implemented by means of antenna arrays. But, angulation employing antenna arrays is not suitable for rich multipath environments such as indoor UWB propagation channel due to the cost and imprecise location estimation [14]. On the other hand, signal strength based methods provide high accuracy only for the short ranges since the Cramer-Rao Lower Bound (CRLB) for these methods depend on the distance [12]. Moreover, the performance of the estimator for signal strength techniques depends on the channel parameters such as the path loss factor and standard deviation of the shadowing effects. Additionally, CR does not have much control over the channel parameters but to measure them in order to adjust the accuracy. Since the accuracy of TOA techniques mainly depends on the parameter that transceiver can control, it is the most suitable location estimation technique for the CPS. Therefore, the legacy TOA technique is improved and referred as adaptive-TOA (A-TOA) in this specification. This technique is adopted for the CPS in order to determine the required effective bandwidth and consequently to estimate the location information. Dynamic spectrum management (DSM) in CR technology can be used for both communications [15] and positioning systems. However, the performance and optimization requirements for both systems can be different. For instance, one of the main performance parameters in the communications systems is data rate, whereas it is accuracy in the positioning systems.

Similarly, the optimization algorithm that is used by DSM for the communications and positioning systems can be different. The optimization algorithm used by DSM to support positioning systems is referred as enhanced dynamic spectrum management (EDSM) in this specification. The disclosed CPS allows CR to adjust the positioning accuracy adaptively in both indoor and outdoor environments. This technique is composed of two modes, which are bandwidth determination and EDSM.

In the first mode, CPS determines the required effective bandwidth for a given accuracy. A-TOA estimation technique is used in this mode. The required effective bandwidth is determined using the bandwidth determination equation, which is derived through CRLB for both additive white Gaussian noise (AWGN) and multipath channels in this specification. Once the effective bandwidth is determined, the second mode that is the EDSM system is initiated. The main responsibility of the EDSM is to search, find and provide the optimum available bandwidth to the CPS. Two EDSM schemes, which are overlay spectrum access based EDSM (O-EDSM) and hybrid overlay and underlay spectrum access based EDSM (H-EDSM) are disclosed. An algorithm for H-EDSM method that is used to switch between underlay and overlay spectrum usage modes is introduced. The switching algorithm is developed based on Two-slope (2-Ray) model. Finally, the specified relative bandwidth is used by the reference CR node to transmit signal, and a TOA based location estimation algorithm (e.g. A-TOA) is employed by the target CR node to estimate the location with given accuracy. Note that it is assumed that the reference and target CR nodes agree on the relative bandwidth during the initial ranging handshake mechanism. Moreover, simulation results and challenges related to the implementation of CPS are presented in this specification.

The specification is organized as follows: a definition of CR along with the system model is provided in Section II. In Section III, theoretical analysis for bandwidth determination in both AWGN and multipath channels through the CRLB is presented. In Section IV, the EDSM system for the CPS along with O-EDSM and H-EDSM schemes are discussed. Simulation results and implementation challenges of the disclosed CPS are presented in Section V. The remarkable conclusions and further studies are outlined in Section VI.

BACKGROUND AND SYSTEM MODEL

A globally recognized clear-cut definition of CR does not exist yet. However, there are some significant efforts to clearly define the new concepts and terminologies such as recent formation of the IEEE 1900 standard [16]. The purpose of IEEE 1900.1 Working Group is to provide technically precise definitions and explanations of key concepts in the fields of spectrum management, policy defined radio, adaptive radio, software defined radio, and related technologies. Moreover, most of the existing definitions of CR and their comparison can be found in [17]. In this specification, the inventors adopted the CR definition that includes the features of all the existing CR definitions reported in [17]. The inventors define CR as a radio transceiver that has the following capabilities; adaptation, sensing (e.g. internal (its own capabilities) and external (environment)), awareness (e.g. internal and external), learning (e.g. environment), goal driven autonomous operation, no interfering other devices or at predefined level. The type of location information that needs to be estimated or sensed plays an important role to determine the complexity of the positioning systems. Hence, the location information is classified into four categories based on its dimension; 1-dimensional (1-D), 2-D, 3-D, and 4-D [1], [2]. The location of a device or object can be determined either by estimation or sensing techniques. The former ones such as triangulation and proximity require certain amount of measurements based on the technique used whereas the latter ones such as scene analysis require sensing devices to observe or acquire some information from the environment. In the majority of location estimation and sensing techniques, the dimension of location information that needs to be estimated or sensed determines minimum number of reference devices required and the geometric relationship between them. For instance, distance measurements from three devices (multilateration) that are located in a non-collinear manner are required to estimate the location of a device in 2-D. On the other hand, estimation of the 3-D location of a device requires the distance measurements from four non-coplanar devices [18]. As a result, CR can optimize the performance and complexity of the positioning algorithm by having a priori information about the dimension of the location information. For instance, the signal traffic and power consumption due to the positioning in CR and cognitive wireless network can be reduced.

A long-felt but unfulfilled need exists for an adaptive positioning system for cognitive radios.

SUMMARY OF INVENTION

The disclosed adaptive positioning system for cognitive radios in this specification is referred as cognitive positioning system (CPS). The CPS allows cognitive radios to adjust the positioning accuracy adaptively in both indoor and outdoor environments. This technique is composed of two modes, which are bandwidth determination and hybrid overlay and underlay enhanced dynamic spectrum management (H-EDSM) system. Since the accuracy of TOA techniques mainly depends on the parameters that transceivers can control, it is one of the most suitable location estimation techniques for the disclosed CPS [8]. Therefore, legacy TOA technique is improved and it is referred as adaptive TOA (A-TOA) method in this specification. This technique is adopted for the CPS to determine the required effective bandwidth as well as to estimate the location information.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
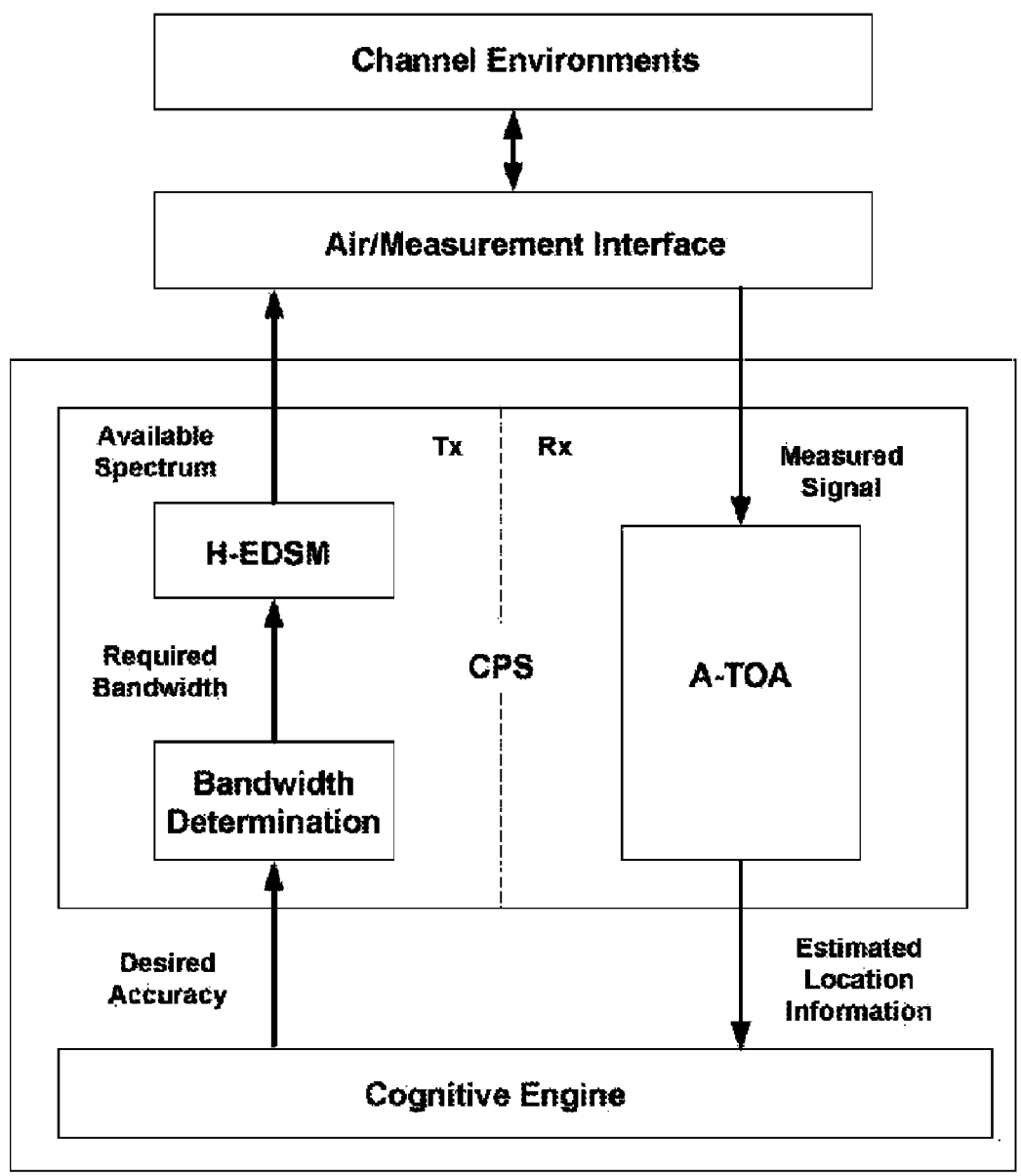
FIG. 1 is a block diagram of the claimed cognitive positioning system.

In this invention, estimation of 1-D location information between two CR devices using the disclosed CPS is provided.

Although the analysis is provided for the estimation of 1-D location information, it can be easily extended to the estimation of multi-dimensional location information by one of ordinary skill in the art. In the CPS system, a reference CR transmits a stream of pulses. In this specification, it is assumed that reference and target CR devices are perfectly synchronized. A single-pulse system where a pulse p(t) with the duration of $T_p$ is transmitted over a symbol duration $T_s$ is considered for the sake of analysis. However, the analysis can easily be extended to the multipulse case. It is also assumed that $T_s$ is large enough to avoid intersymbol interference (ISI). The inventors define energy of the pulse as $\epsilon_p \epsilon_p^* = \int_{-\infty}^{+\infty} p^2(t) dt$. In our case, the symbol energy $\epsilon$ equals to $\epsilon_p$ due to transmission of a pulse per symbol and the inventors assumed that $\epsilon_p=1$. Since the modulation is not used for positioning purpose [19], the transmitted waveform is, $$s(t) = \sqrt{\varepsilon} \sum_k p(t - kT_s). \quad (1)$$

BANDWIDTH DETERMINATION IN AWGN CHANNELS

By considering that CR transmits the signals over a single-path AWGN channel, the received signal r(t) is, $$r(t) = s(t) = s(t-\tau) + n(t), \quad (2)$$

where $\tau$ is the path delay to be estimated (path amplitude assumed to be unity) and n(t) is zero-mean white Gaussian noise with a spectral density of $\sigma_0^2$. The log-likelihood function of $\tau$ is given by, $$\Lambda(\tau) = \frac{1}{2\sigma_0^2} \int_0^{T_o} [r(t) - s(t-\tau)]^2 \, dt. \quad (3)$$

where $T_o = KT_s$ is the observation period that consists of K symbols. The Fisher Information Matrix (FIM) for $\tau$ is a $1 \times 1$ matrix and the element $L_{\tau\tau}$ is given by [20], $$J_{\tau\tau} = \frac{1}{2\sigma_0^2} \int_0^{T_o} [\dot{s}(t-\tau)]^2 \, dt, \quad (4)$$

where $s^*(t) = \partial s(t)/\partial \theta$ is the first-derivative function of s(t). After straightforward algebraic manipulations, the variance of delay estimation error var[$\hat{\tau}$] is obtained (also known as CRLB), $$\text{var}[\hat{\tau}] = \left( K_{\gamma_s} \int_0^{T_s} [\dot{p}(t-\tau)]^2 \, dt \right)^{-1}, \quad (5)$$

where $\gamma_s = \epsilon/\sigma_0^2$ is the symbol signal-to-noise ratio (SNR). By using the Fourier transformation along with its time differentiation property, the frequency domain representation of (5) is, $$\text{var}[\hat{\tau}] = \frac{1}{K_{\gamma_s} \beta^2}, \quad (6)$$

where $\beta$ is the effective bandwidth of p(t) and it is defined as, $$\beta = \left[ \int_{-\infty}^{+\infty} \omega^2 |P(w)|^2 \, d\omega \right]^{1/2}, \quad (7)$$

where P(w) is the Fourier transform of p(t). Despite the fact that legacy systems employ generally the electromagnetic waves for the transmission, CR can have a capability to use different waves that have different velocities depending on the situation. For instance, the velocity of the sound wave is 344 meter/second (m/s) whereas the velocity of the light c is approximately $3 \cdot 10^8$ m/s in the air [18]. Hence, the estimated delay is given by $\hat{\tau} = \hat{d}/v$ where $\hat{d}$ and v are the estimated distance and velocity of the waves, respectively. After some modifications on (6), the bandwidth determination equation is obtained, $$\beta = \sqrt{\frac{v^2 M(\hat{d})}{K_{\gamma_s}}}, \quad (8)$$

where $M(\hat{d})$ is the positioning accuracy, which is inversely proportional to the variance of distance estimation error ($M(\hat{d}) = 1/\text{var}[\hat{d}]$). In the disclosed CPS, CR specifies the desired accuracy $M(\hat{d})$ along with K, $\gamma_s$ and v values. Then, the required effective bandwidth is determined by using (8). As a numerical example, if the CR requires to have an accuracy of $M(\hat{d})=0.25$ m$_{-2}$ at $\gamma_s=10$ dB over K=10 symbols using the electromagnetic waves (v=c), the required effective bandwidth is $\beta=15$ MHz. Furthermore, the following equation is obtained by assuming K, $\gamma_s$ and v values are fixed to show the bandwidth-accuracy relationship, $$\frac{\beta_1}{\beta_2} = \sqrt{\frac{M(\hat{d}_1)}{M(\hat{d}_2)}}. \quad (9)$$

For instance, if the CR needs to reduce the accuracy from 0.25 m$_{-2}$ to 0.0625 m$_{-2}$ the required bandwidth decreases from 15 MHz to 7.5 MHz. Once the CPS determines the required effective bandwidth for a given accuracy, granting and utilization of the effective bandwidth are handled by the EDSM system that is discussed in the later sections. For the disclosed EDSM scheme, it is assumed that K, $\gamma_s$, and v parameters are fixed and known.

A similar approach can be followed to derive bandwidth determination equation for multipath propagation channels, which the detailed derivation can be found in the Appendix.

EDSM SYSTEM

Once the CPS determines the required effective bandwidth for a given accuracy, it consults to the EDSM system for the availability of the required bandwidth in the spectrum. If the EDSM system informs the CPS that the desired effective bandwidth is available to be used, then CR transmits the signal with the required bandwidth to achieve the desired positioning accuracy.

There are two main approaches of spectrum sharing for communications systems (not for positioning systems) in the literature, which are overlay (opportunistic) and underlay [21], [13]. In the former approach, unlicensed users are allowed to utilize the licensed bands in opportunistic and non-interfering manners and temporarily in the absence of the associated licensed users. On the other hand, the basic idea behind the latter approach is permitting low power unlicensed users, which operate at the noise level of the licensed users, to utilize the licensed bands simultaneously with the associated licensed users.

Probability of finding unused bands in the spectrum is one of the main metrics behind the idea of EDSM. Some measurement results on the utilization of spectrum are reported in the literature [22], [23]. In [22], a measurement campaign is conducted to determine the usage of 30-3000 MHz spectrum. The results show that only 13% of the this spectrum is utilized on average. Furthermore, similar measurement campaign is performed for 3-6 GHz frequency band. According to the results, the actual spectrum utilization in 3-4 GHz band is 0.4% and this drops to 0.3% in the 4-5 GHz band.

These results imply that statistically more unused bands are available at higher frequencies (e.g. above 3 GHz). However, operating at higher frequencies has some disadvantages such as higher propagation loss and lower range and penetration compared to low frequency bands [24]. Moreover, weather induced impairments and attenuation have impacts on the high frequency propagation as well [25], which needs to be considered in the EDSM systems. One of the methods to combat the aforementioned losses due to operating at high frequencies is to use appropriate antennas (e.g. directional antennas) and advanced multiple antenna systems (e.g. MIMO, beamforming) [26]. Especially, MIMO systems can be used to improve the spectrum efficiency in the EDSM systems [13]. Furthermore, MIMO systems can be used to improve the accuracy of positioning systems [27]. In the cognitive positioning context, MIMO systems require less bandwidth than single antenna systems for achieving a given accuracy, which is another way of improving the bandwidth efficiency in the EDSM systems. Although single-antenna systems are considered for the disclosed CPS in this specification, the analysis can be extended to the multiple-antenna systems case.

Let the set of available relative bandwidth for $\beta$ in the spectrum be $\chi_n$, which is defined as $$\chi_n = \frac{f_{max}}{fc_n}, n = 1, \ldots, N, \quad (10)$$

where $f_{max}$ is the maximum frequency component of the available bandwidth and it is defined as $(fc_n+\beta/2)$. Center frequency of nth available relative bandwidth and the total number of available relative bandwidth are denoted as $fc_n$ and $N$, respectively. It is assumed that $fc_n<fc_{n+1}$, $\forall n$ is satisfied. Furthermore, let B to be the optimum relative bandwidth in terms of providing the desired accuracy, which is estimated by the EDSM. Achieving more approximate positioning accuracy comes with the cost of additional complexity.

Therefore, O-EDSM and H-EDSM are two schemes that are disclosed in order to exhibit the trade-off between the positioning accuracy and the complexity of the EDSM.

A. O-EDSM Technique

In the case of availability and unavailability of $\beta$, the rules and criteria for each case are outlined as follows.

Condition A: If there are some available unused bands for overlay spectrum access;

1) If the exact $\beta$ is available;
N=1: Since there is no any other choice, B=$\chi_1$.
N>2: This implies that the desired $\beta$ is available in more than one portion of the spectrum. In such case, B is selected using the following criterion, $$B = \left\{ \chi_{\hat{n}} \mid \hat{n} = \operatorname*{argmax}_{k}(\chi_n) \right\}. \quad (11)$$

The reason behind this selection criterion is that transmission over low relative bandwidth may introduce additional frequency-dependent path loss, which can decrease the detection probability of the first arrival path. As a result, detection probability of the first arrival path in TOA estimation technique affects the positioning accuracy. However, the probability of finding an unused band for the desired bandwidth in the high frequency bands (e.g. above 3 GHz) is greater than low frequency bands since the latter ones are more attractive.

2) If the exact $\beta$ is not available;
Find an available relative bandwidth that is the closest to the desired bandwidth.
Let $\tilde{\beta}_k$ the k-element vector of available effective bandwidth ordered from low to high center frequency for a given time. Also, let bandwidth error $\rho$ be the metric that is used to select the most approximate effective bandwidth. The corresponding k-element bandwidth error vector $\rho_k$ is defined as $$\rho_k = |\tilde{\beta}_k - \beta|. \quad (12)$$

The effective bandwidths providing the minimum bandwidth error are determined.

Note that bandwidth resolution of CR can affect the magnitude of the bandwidth error. Moreover, the bandwidth error affects the performance of the CPS, which is out of scope of this specification. The n-element vector (n≦k) containing these effective bandwidths is denoted as $\tilde{\beta}_n$ and its elements are determined using the following equation, $$\tilde{\beta}_n = \left\{ \tilde{\beta}_{\hat{k}} \mid \hat{k} = \operatorname*{argmin}_{n}(\rho_k) \right\}. \quad (13)$$

Use (10) to obtain the corresponding available relative bandwidths for $\tilde{\beta}_n$, which are $\chi_n$. Finally, the resultant B is obtained by using (11).

Condition B: If there is no available bandwidth in the spectrum using overlay spectrum access; Efficient usage of the spectrum depends on the performance of spectrum shaping technique that is employed. OFDM is one of the candidate spectrum shaping methods for CR technology.

There are two type of OFDM-based spectrum shaping techniques, which are single band-OFDM (SB-OFDM) and multi band-OFDM (MB-OFDM) [2]. As the name implies, the former shapes the spectrum using single bandwidth, whereas the latter shapes the spectrum by dividing the total bandwidth into sub-bandwidths. Ideally, it is desirable that spectrum shaping techniques allocate bandwidths to the users in uncluttered manner where there are not much gaps between them.

However, in reality, the bands can be cluttered resulting in the spectrum being full instantaneously or temporarily. However, if the bandwidth allocation process is statistically updated often enough then the existence of such cases would not be a problem. As a worst case scenario where there is no any available bandwidth in the spectrum, the CPS declares that it cannot estimate the location of the device at the moment.

B. H-EDSM Technique

It is desirable to find the exact β rather than the β in the EDSM mode. In the case of unavailability of the exact β in the overlay spectrum usage manner, it can be available to be utilized using underlay spectrum access techniques. Since these techniques provide limited coverage due to the power limitations, a priori rough information regarding the distance between the target and reference CR devices d is required.

Moreover, a priori information about threshold distance $d_{th}$ that is used to manage the transition between the overlay and underlay spectrum access modes must be available. In this specification, $d_{th}$ is defined as the coverage radius that a CR can establish a link with another CR at acceptable QoS level. If $d \leq d_{th}$ condition is satisfied, the underlay spectrum access techniques can be used. Two-slope (ray) model is considered to derive an equation for the estimation of d and $d_{th}$. Approximate receive power as a function of distance for both indoor and outdoor environments is given by [28]

$$P_{rx}(\tilde{d}) = P_{tx}\left(\frac{\lambda}{4\pi\tilde{d}}\right)^2 \left(\frac{d_o}{d_o+\tilde{d}}\right)^2, \quad (14)$$

where $P_{tx}$ is the transmit power, λ, is the signal wavelength, and $d_o$ is the Fresnel breakpoint distance (FBD). The FBD for both indoor and outdoor environments can be determined by [28], $$d_o = \frac{12 h_{tx} h_{rx} f}{v}, \quad (15)$$

where $h_{tx}$ and $h_{rx}$ are the heights of the transmitter and receiver antennas from the ground, respectively. Since $d_o$ depends on the operational environment, ideal CR can sense the environments using a sensing technique such as scene analysis to determine its operational environment (i.e. indoor or outdoor) [13], [29], [30], [31], [1], [2], [3]. Moreover, ideal CR can determine roughly its antenna height from the ground by using a sensing technique. If this is not the case, predefined constraints and information on $h_{tx}$ and $h_{rx}$ can be provided to the CR. The total received power P can be defined as, $$P(\tilde{d}) = P_{rx}(\tilde{d}) + I + \eta, \quad (16)$$

where I and η represent the total interference seen by the target CR receiver and thermal noise, respectively. After manipulating (16), the following equation in unknown d is obtained, $$\tilde{d}^2 + d_o \tilde{d} - \sqrt{\frac{P_{tx}}{P(\tilde{d}) - I - \eta}}\left(\frac{\lambda d_o}{4\pi}\right) = 0. \quad (17)$$

TABLE I

A NUMERICAL EXAMPLE FOR DETERMINING $\tilde{d}$ AND $d_{th}$.

|  | Indoor | Outdoor | Unit |
|---|---|---|---|
| $d_o$ | 10 | 60 | m |
| $h_{tx}$ | 1.66 | 5 | m |
| $h_{rx}$ | 1.2 | 1.2 | m |
| f | 125 | 250 | MHz |
| $P_{tx}$ | −42 | −42 | dBm |
| $P_{rx}$ | −70 | −100 | dBm |
| $P_{tx,max}$ | −41.3 | −41.3 | dBm |
| $P_{rx,min}$ | −80 | −80 | dBm |
| κ | 630.96 | 630960 | - |
| $\kappa_{max}$ | 7413.1 | 7413.1 | - |
| d | 13.54 | 103.83 | m |
| $d_{th}$ | 18.76 | 67.32 | m |

By solving (17), the following equation for the unknown d is obtained, $$\tilde{d} = \left|0.5\left[d_o + \sqrt{d_o^2 + \sqrt{\kappa}\,\frac{v d_o}{f\pi}}\right]\right|, \quad (18)$$

where $\kappa=(P_{tx}/P_{rx})$ and it can be considered as the instantaneous dynamic range of a CR transceiver. The bounds on $P_{tx}$ and f are determined by the regulatory agencies. For instance, if UWB technology is considered for underlay spectrum shaping [32] maximum $P_{tx}$ for indoor environments is determined by Federal Communications Commission (FCC) in the United States to be −41.3 dBm/MHz [33]. The allocated frequency ranges for UWB devices are 3.1-10.6 GHz and 100-960 MHz. Maximum allowable $P_{tx}$ mandated by the regulatory agencies is denoted by $P_{tx,max}$, $P_{rx}$ level is mainly limited by the sensitivity of CR receiver, which is defined as the minimum power level that can be detected ($P_{rx,min}$) It is reported that acceptable minimum signal level at the mobile devices are −90 dBm [28]. The following ratio is defined as maximum dynamic range of CR transceiver, $$\kappa_{max} = \frac{P_{tx,max}}{P_{rx,min}}. \quad (19)$$

By substituting κ for $\kappa_{max}$ in (18), the following equation that determines $d_{th}$ is obtained, $$d_{th} = \left|0.5\left[d_o + \sqrt{d_o^2 + \sqrt{\kappa_{max}}\,\frac{v d_o}{f\pi}}\right]\right|. \quad (20)$$

Numerical examples for determining d and $d_{th}$ for both indoor and outdoor environments are tabulated in Table I. According to these results, CR cannot utilize the spectrum in an underlay manner for outdoor case since $d > d_{th}$. On the other hand, CR can switch to the underlay spectrum usage mode in indoor case since $d \leq d_{th}$ is satisfied.

Signal-to-interference and noise ratio (SINR) is an important parameter that is used to measure the reliability of the link and it is defined as, $$SINR = \frac{P_{tx}\left(\frac{\lambda}{4\pi d}\right)^2 \left(\frac{d_o}{d_o + d}\right)^2}{1 + \eta}. \quad (21)$$

The link outage probability $P_{out}$ is given by the following equation and it can be solved in a straightforward manner [34], $$P_{out} = Pr(SINR \leq SINR_{th}), \quad (22)$$

where $SINR^{th}$ is a given threshold SINR value and $Pr(.)$ represents the probability function. In this specification, it is assumed that connectivity is lost when SINR is below a given $SINR_{th}$.

The steps for the H-EDSM scheme in order to provide β are given as follows.

Condition A: If there are some available unused bands for overlay and/or underlay spectrum access;
1) If the exact β is available in the overlay mode, follow the two steps of case 1 in the O-EDSM method to determine B.
2) If the exact β is not available in the overlay mode;
Determine d and $d_{th}$ parameters using (18) and (20).
a. If $d \leq d_{th}$;
If the exact β is available in the underlay mode, follow the two steps of case 1 in the O-EDSM method to determine B.
If the exact β is not available in the underlay mode either;
Find an available effective bandwidth that provides the most approximate desired effective bandwidth in both underlay and overlay modes. The available effective bandwidth vectors for underlay and overlay modes are denoted as $β_m$ (m-element) and $β_k$ (k-element), respectively.
The corresponding bandwidth error vectors for underlay and overlay modes are denoted as $ρ_m$ and $ρ_k$, respectively. These vectors are determined by using (12).
Determine the minimum bandwidth error $ρ_{min}$ using the following equation, $$ρ_{min} = min(min(ρdm), min(ρ_k)). \quad (23)$$

Follow the last two steps of Condition A-2 section in O-EDSM system to determine B.
b. If $d > d_{th}$;
Determine the most approximate effective bandwidth in the overlay mode by following all three steps of Condition A-2 section in O-EDSM system.
Condition B: If there is no available bandwidth in the spectrum using both overlay and underlay spectrum access;
Follow the steps in Condition B for the O-EDSM technique.

SIMULATION RESULTS AND DISCUSSIONS

One way of exploiting the usage of spectrum in underlay manner is to increase $d_{th}$. According to (20), $d_{th}$ depends on the $d_o$, $K_{max}$, v, and f. By assuming that $h_{tx}$, $h_{rx}$, and v are fixed parameters, $K_{max}$ and f are the main controllable parameters that affects $d_{th}$. The parameter f has two main effects on $d^{th}$. According to the first effect, $d_{th}$ is inversely proportional to f, which can be seen clearly in (20). This effect can be explained by the relationship between the frequency and radiated ("on the air") power. According to the second effect, which can be explained by f in (15), f is proportional to $d_{th}$. This implies that increasing f will increase FBD, which translates into an increase in $d_{th}$. As a result, it is recommended to consider these two effects during the estimation of the optimum f, which is out of scope of this specification.

Figure 2:
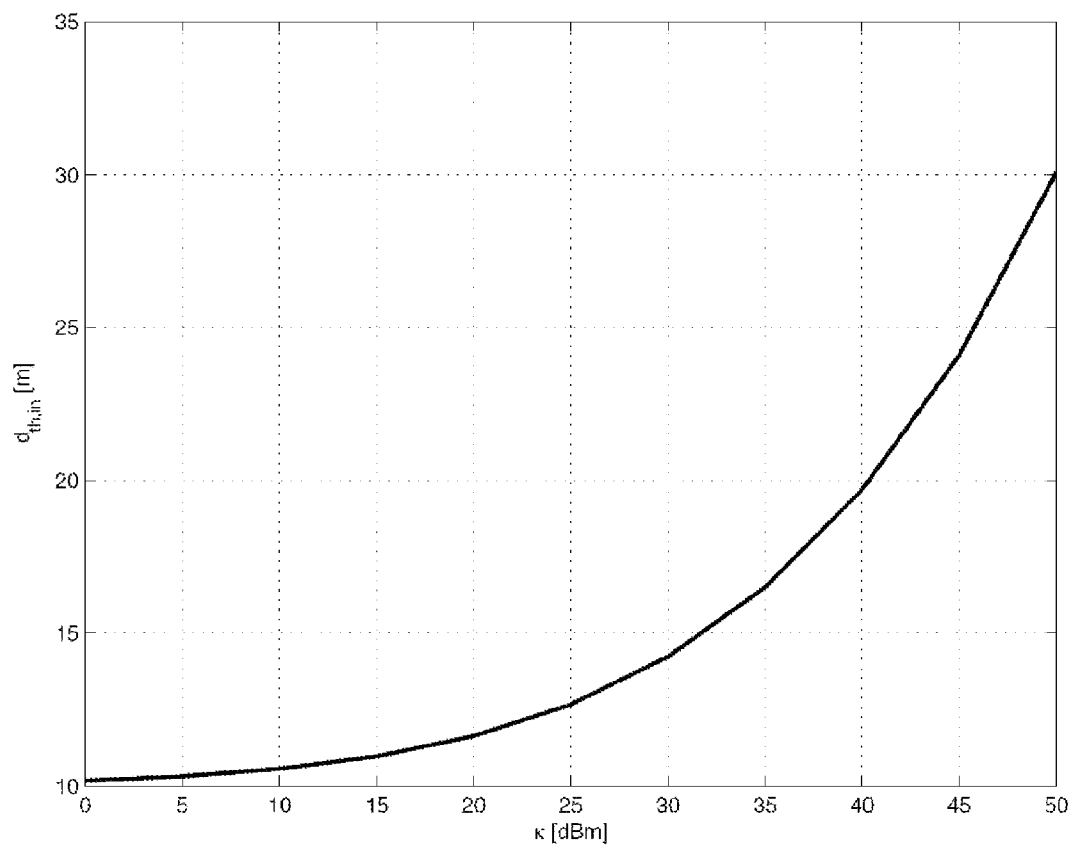
FIG. 2 is a graph showing the effects of $\kappa$ on $d_{th,in}$ ($h_{tx}$=1.66 m, $h_{rx}$=1.2 m).
Figure 3:
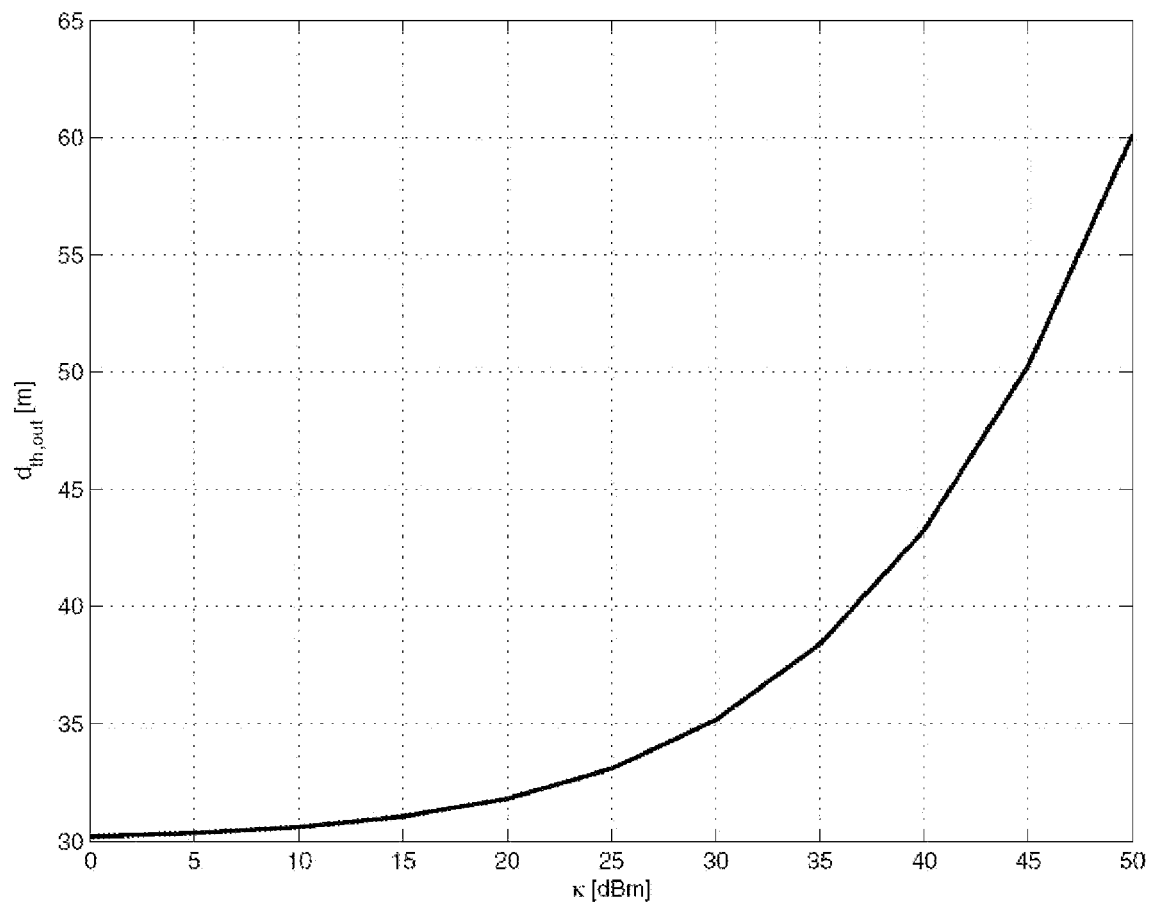
FIG. 3 is a graph showing the effects of $\kappa$ on $d_{th,out}$ ($h_{tx}$=1.2 m, $h_{rx}$=5 m).

The second main parameter that effects the $d_{th}$ is $K_{max}$, which consists of $P_{tx,max}$ and $P_{rx,min}$ parameters. The former one is determined by the regulatory agencies whereas the latter one is determined by the designer and it is limited by the hardware capabilities. The performance of CR transceiver are limited between these two bounds, but it can have a capability to operate adaptively between the bounds. Hence, the effects of $K_{max}$ on $d_{th}$ for both indoor and outdoor environments are studied and the results are plotted in FIGS. 1 and 2, respectively. The results agree with that $K_{max}$ is proportional to the $d_{th}$. Bandwidth determination equations (8) and (37) are derived along with the EDSM to prove the concept of the disclosed CPS. Since both estimators are obtained via CRLB, they provide the optimum performances. However, it is difficult (especially for multipath case) to approach to the lower bound in practice due to the non-linear characteristic of the devices in CR transceivers. Furthermore, samples at or above Nyquist rate are required since the bandwidth determination equations are derived through Maximum Likelihood (ML) estimation.

Since the β is dynamically changed in the CPS, sampling rate is not an issue for the low β whereas it can be an issue for the high β. Either the signal can be down-converted to reduce the analog-to-digital converter (ADC) requirements or it can be assumed that CR has software defined radio (SDR) [2] capability to digitize the signal at high sampling rates. Dynamically changing the sampling rate and characteristics of the filters such as bandwidth and center frequency in both transmit and receive chains are parts of the EDSM system, which can also be realized by the SDR feature of CR.

There are several possible ways to improve the accuracy if the exact β is unavailable and stringent accuracy is required. One way of doing this is to employ the disclosed H-EDSM scheme. Of course, this advantage comes with additional complexity and a priori information requirements, which are d and $d_{th}$. On the other hand, the disclosed O-EDSM is suitable for the applications where the desired accuracy requirements are relaxed relative to the H-EDSM. Notice that K, $γ_s$, and v parameters are assumed to be fixed for the disclosed EDSM. Another solution for bringing the accuracy to the desired level as much as possible is to change these three parameters adaptively as well. However, this improvement also comes with the cost of additional complexity. Using super-resolution algorithms for TOA estimation to improve the accuracy [35] is another alternative technique. But, the main drawback of this technique is that the accuracy improvement for $β \geq 120$ MHz is negligible. It can be concluded that there is a trade-off between the positioning accuracy and the complexity. In this specification, it is assumed that the reference and target CR devices are perfectly synchronized. However, additional accuracy error due to the imperfect synchronization (which is a practical case) needs to be included when modeling the overall performance of the disclosed CPS. As a result, joint or disjoint synchronization and CPS algorithms can be developed for CRs and consequently, the effects of imperfect synchronization on the CPS performance can be investigated and quantified further.

CONCLUSIONS

A novel CPS technique composed of bandwidth determination and EDSM modes to achieve accuracy adaptation is presented. CR with the CPS provides given accuracy adaptively in both indoor and outdoor environments. Two EDSM schemes, which are O-EDSM and H-EDSM, are presented. The latter one can provide higher positioning accuracy than the former one with the cost of additional complexity. For the H-EDSM, a switching algorithm that is used to manage the transition between the underlay and overlay spectrum usage modes is introduced. Simulation results along with the discussions on challenges and complexity of the implementation of the disclosed CPS are presented.

Since the emphasis of this study is to develop the transmitter side of the CPS, optimal and suboptimal receiver algorithms for the CPS can be developed. Furthermore, the presented theoretical derivation of bandwidth determination equation in multipath channels can be extended to the generic case, where the paths can be overlapped and/or non-overlapped depending on the transmission bandwidth and environment. Finally, synchronization algorithms for CRs can be developed and the effects of imperfect synchronization on the performance of CPS can be studied.

APPENDIX

Derivation of Bandwidth Determination Equation in Multipath Channels

After passing the transmitted signal (1) through multipath propagation channel, the received signal takes the following form, $$r(t) = \sum_{j=1}^{L} \alpha_j s(t - \tau_j) + n(t), \quad (24)$$

where L is the number of paths, $\alpha_j$ and $\tau_j$ are the amplitude and delay of jth path, respectively. For the sake of simplicity, the path gain is assumed to be real to neglect the set of unknown path phases. Moreover, high-accuracy positioning requires utilization of large bandwidth during the transmission.

As a result, there exists another set of unknown parameters that are called frequency-dependent path gains in the UWB as well as wideband propagation channel environments [36]-[39]. To simplify the analysis, this set of unknown parameters is not included into the trial vector either. Let the channel unknown parameters vector $\theta$ to be $[\alpha_1, \ldots, \alpha_L, \tau_1, \ldots, \tau_L]T$, which has 2 L elements. The corresponding FIM can be obtained by following the similar steps in AWGN channel case. The resultant FIM is a 2 L×2 L matrix and it can be represented as [14], $$J_\theta = \begin{bmatrix} M_{\alpha\alpha} & M_{\alpha\tau} \\ M_{\alpha\tau} & M_{\tau\tau} \end{bmatrix}, \quad (25)$$

where each element of $J_\theta$ is an L×L Hessian type matrix that has the following form, $$M_{\alpha\alpha} = \begin{bmatrix} J_{\alpha_1\alpha_1} & J_{\alpha_1\alpha_2} & \cdots & J_{\alpha_1\alpha_L} \\ J_{\alpha_2\alpha_1} & J_{\alpha_2\alpha_2} & \cdots & J_{\alpha_2\alpha_L} \\ \vdots & \vdots & \ddots & \vdots \\ J_{\alpha_L\alpha_1} & J_{\alpha_L\alpha_2} & \cdots & J_{\alpha_L\alpha_L} \end{bmatrix}. \quad (26)$$

Note that for low positioning accuracy, small effective bandwidth is required. This results in paths to be overlapped in the received signal. In such case, it is a tedious task to derive the closed-form of submatrices of FIM (e.g. $M_{\alpha\tau}$). Therefore, it is assumed that the paths are not overlapping (large bandwidth assumption) in order to simplify the derivation of bandwidth determination equation in this specification. As a result, the following equation that determines the elements of $M_{\alpha\alpha}$ matrix is obtained by assuming that the paths are not overlapping each other [14], $$M_{\alpha\alpha} = \begin{cases} J_{\alpha_i\alpha_j} = K\gamma_s\epsilon_p & \text{if } i = j \\ J_{\alpha_i\alpha_j} = 0 & \text{if } i \neq j \end{cases}, \quad (27)$$

where i=1, ..., L and j=1, ..., L. As a result, $M_{\alpha\alpha}$ matrix is given by, $$M_{\alpha\alpha} = K\gamma_s\epsilon_p I_{L\times L}, \quad (28)$$

where $I_{L\times L}$ is an L×L identity matrix. Similarly, the elements of $M_{\alpha\tau}$ are determined based on the following equation, $$M_{\alpha\tau} = \begin{cases} J_{\alpha_i\tau_j} = -2K\gamma_s\dot{\zeta}_p\alpha_i & \text{if } i = j \\ J_{\alpha_i\tau_j} = 0 & \text{if } i \neq j \end{cases}, \quad (29)$$

where $$\dot{\zeta}_p = \int_0^{T_p} p(t)\dot{p}(t)dt. \; M_{\alpha\tau}$$

is a diagonal matrix that is given by, $$M_{\alpha\tau} = -2K\gamma_s\dot{\zeta}_p\text{diag}(\alpha_1, \ldots, \alpha_L)_{L\times L} \quad (30)$$

where diag(.) represents the diagonal matrix. With a similar approach, the elements of $M_{\tau\tau}$ matrix are obtained using the following equation, $$M_{\tau\tau} = \begin{cases} J_{\tau_i\tau_j} = K\gamma_s\ddot{\zeta}_p\alpha_i^2 & \text{if } i = j \\ J_{\tau_i\tau_j} = 0 & \text{if } i \neq j \end{cases}, \quad (31)$$

where $$\ddot{\zeta}_p = \int_0^{T_p} [\dot{p}(t)]^2 dt. \; M_{\tau\tau}$$

is also an orthogonal matrix and has the following form, $$M_{\tau\tau} = K\gamma_s\ddot{\zeta}_p\text{diag}(\alpha_1^2, \ldots, \alpha_L^2)_{L\times L}. \quad (32)$$

The FIM in (25) can be written as in (33).

$$J_\theta = K\gamma_s \begin{bmatrix} \epsilon_p I_{L\times L} & -2\dot{\zeta}_p\text{diag}(\alpha_1, \ldots, \alpha_L)_{L\times L} \\ -2\dot{\zeta}_p\text{diag}(\alpha_1, \ldots, \alpha_L)_{L\times L} & \ddot{\zeta}_p\text{diag}(\alpha_1^2, \ldots, \alpha_L^2)_{L\times L} \end{bmatrix}. \quad (33)$$

Using FIM in (33), the variance of each delay estimate $\hat{\tau}_i$ (CRLB) can be obtained as follows [20], $$\text{var}[\hat{\tau}_i] = (K\gamma_s[\ddot{\zeta}_p - \dot{\zeta}_p^2/\epsilon_p]\alpha_i)^{-1}. \quad (34)$$

Since (34) is analytically intractable to derive the bandwidth determination equation, the inventors represent (34) in the frequency domain by using Fourier transformation along with its time differentiation property, $$\text{var}[\hat{d}_i] = \frac{v}{K\gamma_s \alpha_i G(\beta, w, P(w))}. \quad (35)$$

where $P(w)$ is the Fourier transform of $p(t)$ and $G(\beta,w,P(w))$ is defined as, $$G(\beta, w, P(w)) = \beta^2 \cdot \frac{\left[\int_{-\infty}^{+\infty} w|P(w)|^2 \, dw\right]^2}{\int_{-\infty}^{+\infty} |P(w)|^2 \, dw}. \quad (36)$$

By a simple manipulation of (35), the bandwidth determination equation is obtained, $$G(\beta, w, P(w)) = \frac{vM(\hat{d}_i)}{K\gamma_s \alpha_i}. \quad (37)$$

For instance, if CR needs to improve the accuracy from $M(d_1)$ to $M(d_2)$ ($M(\hat{d}_1) < M(\hat{d}_2)$), the required bandwidth will be increased from $\beta_1$ to $\beta_2$. In this case, the following relationship holds by assuming the pulse waveform is fixed, $$\frac{G(\beta_1, w, P(w))}{G(\beta_2, w, P(w))} = \frac{M(\hat{d}_1)}{M(\hat{d}_{i2})}. \quad (38)$$

Supplemental Simulation Results

Figure 4:
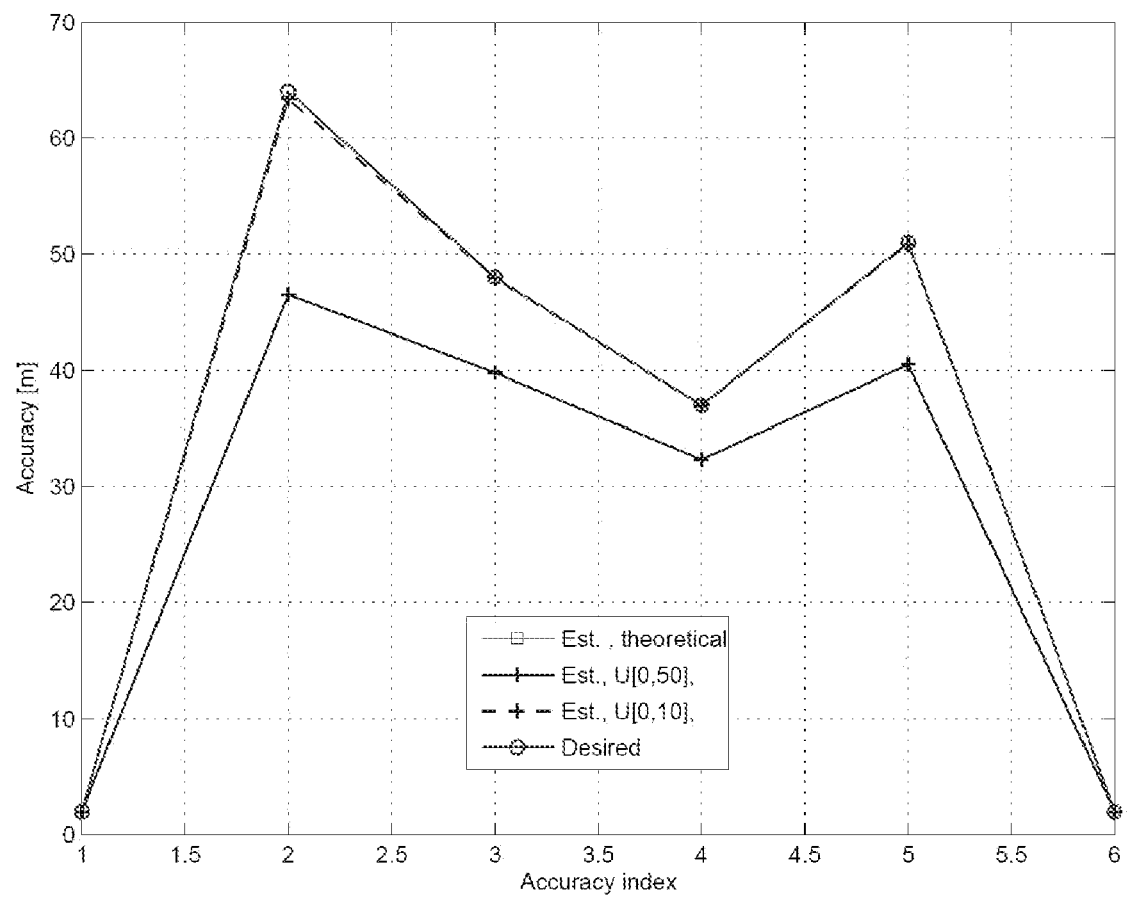
FIG. 4 is a graph showing performance of Maximum Likelihood estimator for accuracy adaptation.
Figure 5:
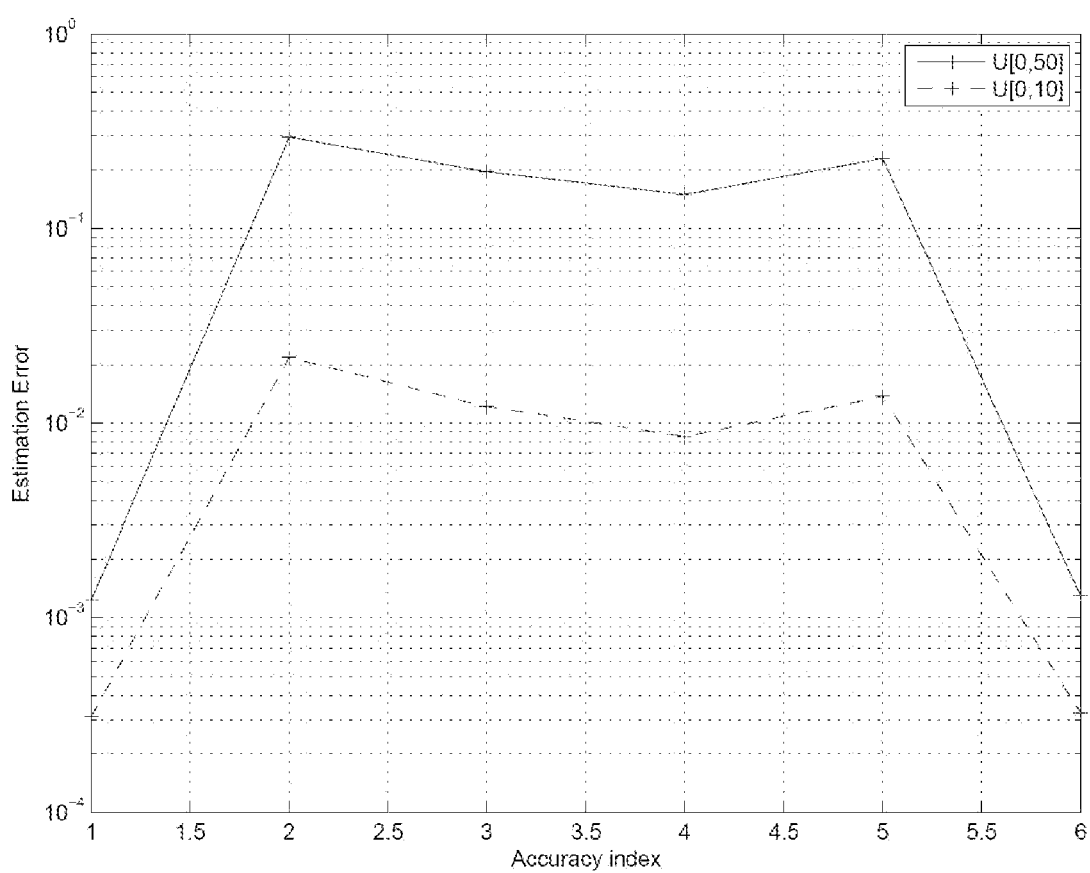
FIG. 5 is a graph showing relative distance estimation error performance of Maximum Likelihood estimator for accuracy adaptation.
Figure 6:
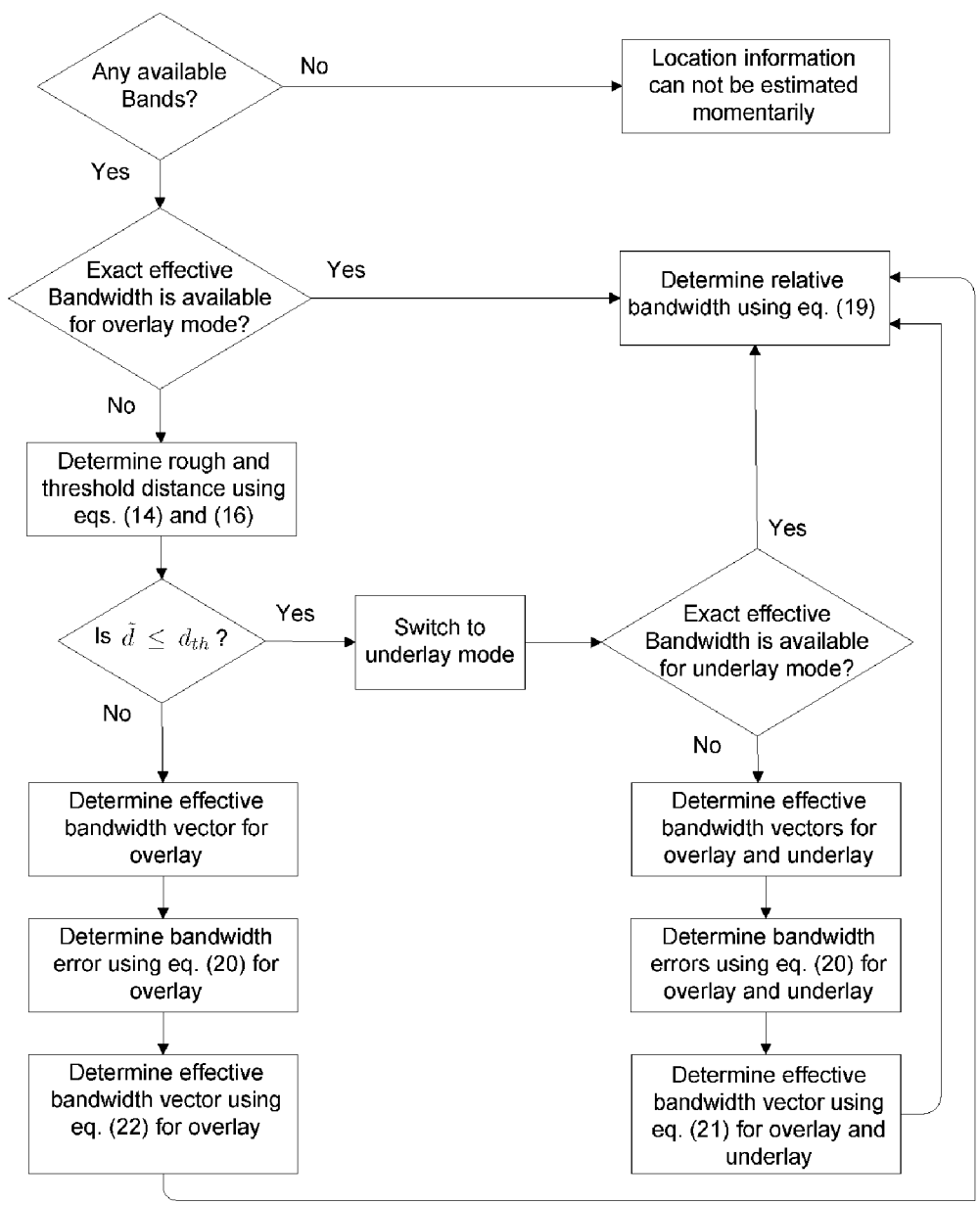
FIG. 6 is a diagrammatic flowchart showing an embodiment of the invention for determining effective bandwidth.

The inventors study the performance of ML estimator for accuracy adaptation in multipath channels where all the paths are independent. The following simulation parameters are used to obtain the results presented in this section: v=3 £ 108 m/s, K=10 symbols, ®=1, and the results are averaged over 1000 simulation runs. Furthermore, Overlay Dynamic Spectrum Access (O-DSA) technique is considered. In the O-DSA, the inventors choose to use Uniform distribution U[a; b] for the available bandwidth. The range for number of available bandwidth that is used for the simulations is U[0; 100]. Moreover, the inventors consider 6 different desired accuracy generated randomly using U[0; 80]m distribution for the desired accuracy. The results showing the performance of ML estimator in terms of ¾[^d] for achieving the desired accuracy are plotted in FIGS. 4 and 5. The randomly generated desired accuracies are f2; 64; 48; 37; 51; 2 gm, which is shown in FIG. 4. Three case are considered to study the performance of ML estimator. The first case referred as "theoretical" where the infinite number and value of bandwidth available to achieve and track the desired accuracies. As the inventors proved previously, ML estimator achieves the desired accuracy dictated by the optimization criteria (CRLB) exactly and this result is supported in FIG. 4 as well. However, due to the nature of O-DSA, the number and value of bandwidth are limited, which is a practical consideration.

In order to study the effects of O-DSA on the performance of ML estimator, two cases are considered, which are U[0; 10] MHz and U[0; 50] MHz. The performance of ML estimator for the case of U[0; 10] MHz is as good as theoretical case. On the other hand, the performance in the case of U[0; 50] MHz is worse than that of U[0; 10] MHz. The relative distance estimation error performance of ML estimator for both U[0; 10] MHz and U[0; 50] MHz cases are plotted in FIG. 5. According to these results, the performance of ML estimator in the case U[0; 10] MHz outperforms U[0; 50] MHz case. It can be concluded that the randomness in the available bandwidth plays an important role on the performance of ML estimator in practical scenarios.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

REFERENCES

The following citations are referenced above and incorporated herein by reference.

[1] H. Celebi and H. Arslan, "Utilization of location information in cognitive wireless networks," *IEEE Wireless Commun. Mag.*, special issue on cognitive wireless networks, August 2007, to appear.

[2] H. Arslan, Cognitive Radio, Software Defined Radio, and Adaptive *Wireless Systems*. Springer, June 2007.

[3] H. Arslan and S. Yarkan, "Exploiting location awareness towards improved wireless system design in cognitive radio," *IEEE Commun. Mag.*, 2007, to appear.

[4] M. Vossiek, L. Wiebking, P. Gulden, J. Wieghardt, C. Hoffmann, P. Heide, S. Technol, and G. Munich, "Wireless local positioning," *IEEE Microwave Mag.*, vol. 4, no. 4, pp. 77-86, 2003.

[5] "Federal Communications Commission (FCC) 911 Services," 2006. [Online] Available: http://www.fcc.gov/911/enhanced/

[6] "StarFire: A Global High Accuracy Differential GPS System," 2006. [Online] Available: http://www.navcomtech.com

[7] "A Taxonomy of Indoor and Outdoor Positioning Techniques for Mobile Location Services," 2003. [Online] Available: www.acm.org

[8] F. van Diggelen, "Indoor GPS theory & implementation," in *Proc. IEEE* Position, Location and Navigation Symposium, April 2002, pp. 240-247.

[9] "Geolocation Development Document," 2006. [Online]. Available: http://www.ieee802.org/22/

[10] C. Fretzagias and M. Papadopouli, "Cooperative location-sensing for wireless networks," in Proc. IEEE Pervasive Computing and Communications, March 2004, pp. 121-131.

[11] H. Celebi, I. Guvenc, and H. Arslan, "On the statistics of channel models for UWB ranging," in *Proc. IEEE Sarnoff Symposium, March* 2006, to appear.

[12] Y. Qi and H. Kobayashi, "On relation among time delay and signal strength based geolocation methods," in *Proc. IEEE Globecom*, vol. 7, December 2003, pp. 4079-4083.

[13] B. Fette, *Cognitive Radio Technology*. Newnes, 2006.

[14] S. Gezici, Z. Tian, G. B. Giannakis, H. Kobayashi, A. F. Molisch, H. V. Poor, and Z. Sahinoglu, "Localization via UWB radios," *IEEE Signal Processing Mag.*, vol. 22, no. 4, pp. 70-84, July 2005.

[15] Y. Xing, R. Chandramouli, S. Mangold, and S. Shankar N, "Dynamic spectrum access in open spectrum wireless networks," *IEEE J. Sel. Areas Commun.*, vol. 24, no. 3, pp. 626-637, March 2006.

[16] "IEEE 1900 Standards Committee on Next Generation Radio and Spectrum Management," 2006. [Online]. Available: http://www.ieeep1900.org/

[17] J. O. Neel, "Analysis and design of cognitive radio networks and distributed radio resource management algorithms," Ph.D. dissertation, Virginia Polytechnic Institute and State University, VA, September 2006.

[18] J. Hightower and G. Borriello, "A survey and taxonomy of location systems for ubiquitous computing," University of Washington, Tech. Rep., 2001.

[19] I. Guvenc and Z. Sahinoglu, "TOA estimation with different IR-UWB transceiver types," in *Proc. IEEE Int. Conf. UWB (ICU)*, September 2005, pp. 426-431.

[20] H. Meyr, M. Moeneclaey, and S. A. Fechtel, *Digital Communication Receivers: Synchronization, Channel Estimation and Signal Processing*. John Wiley and Sons, 1998.

[21] W. Lehr and J. Crowcroft, "Managing shared access to a spectrum Ccommons," in Proc. First IEEE Symposium on New Frontiers in Dynamic Spectrum Access Networks, November 2005, pp. 420-444.

[22] "Dynamic Spectrum Sharing," 2006. [Online]. Available: http://www.sharedspectrum.com/?section=presentations [23] D. Willkomm, J Gross, and A. Wolisz, "Reliable link maintenance in cognitive radio systems," in Proc. First IEEE International Symposium on Dynamic Spectrum Access Networks (DySPAN), November 2005, pp. 371-378.

[24] B. H. Fleury and P. E. Leuthold, "Radiowave propagation in mobile communications: an overview of European research," *IEEE Commun. Mag.*, vol. 34, no. 2, pp. 70-81, 1996.

[25] B. Kim, N. K. Shankaranarayanan, P. S. Henry, K. Schlosser, and T. K. Fong, "The AT&T Labs broadband fixed wireless field experiment," *IEEE Communications Magazine*, vol. 37, no. 10, pp. 56-62, 1999.

[26] K. Sheikh, D. Gesbert, D. Gore, and A. Paulraj, "Smart antennas for broadband wireless access networks," *IEEE Commun. Mag.*, vol. 37, no. 11, pp. 100-105, 1999.

[27] P. Grover, R. Agarwal, and A. K. Chaturvedi, "Geolocation using transmit and receive diversity," in *Proc. IEEE Globecom*, vol. 6, December 2004, pp. 3681-3684.

[28] D. Landi and C. Fischer, "The effects of UWB interference on GSM systems," in International Zurich Seminar on Communications, February 2004, pp. 86-89.

[29] H.-H. Nagel, "Steps towards a cognitive vision system," *Artificial Intelligence Mag.*, vol. 25, no. 2, pp. 31-50, 2004.

[30] J. Hightower and G. Borriello, "Location sensing techniques," *IEEE Computer*, vol. 34, no. 8, pp. 57-66, 2001.

[31] J. Smith, C. Salthouse, and N. Gershenfeld, "Code-division multiplexing of a sensor channel: a software implementation," *IEEE J. Sel. Areas Commun.*, vol. 17, no. 4, pp. 725-731, 1999.

[32] H. Arslan and M. E. Sahin, "Cognitive UWB-OFDM: pushing ultrawideband beyond its limit via opportunistic spectrum usage," *J. Commun. and Networks*, special issue on spectrum resource optimization, vol. 8, pp. 151-157, June 2006.

[33] A. F. Molisch, "Ultrawideband propagation channels-theory, measurement, and modeling," *IEEE Trans. Veh. Technol.*, vol. 54, no. 5, pp. 1528-1545, September 2005.

[34] R. Giuliano and F. Mazzenga, "Performance evaluation of UWB sensor network with Aloha multiple access scheme," in *Proc. International* Workshop on Wireless Ad Hoc Networks, May 2005.

[35] X. Li, K. Pahlavan, and J. Beneat, "Performance of TOA estimation techniques in indoor multipath channels," in *Proc. IEEE Int. Symp. on* Personal, Indoor and Mobile Radio Commun., vol. 2, September 2002, pp. 911-915.

[36] A. F. Molisch, K. Balakrishnan, D. Cassioli, C. C. Chong, S. Emami, A. Fort, J. Karedal, J. Kunisch, H. Schantz, U. Schuster, and K. Siwiak, "IEEE 802.15.4a Channel Model—Final Report," 2005, tech. rep. doc: IEEE 802.15-04-0662-02-004a. [Online]. Available: http://www.ieee802.org/15/pub/TG4a.html

[37] A. Alvarez, G. Valera, M. Lobeira, R. Tones, and J. Garcia, "New channel impulse response model for UWB indoor system simulations," in Proc. IEEE Vehic. Techn. Conf.-Fall, vol. 1, 2003, pp. 1-5.

[38] J. Kunisch and J. Pamp, "Measurement results and modeling aspects for the UWB radio channel," in Proc. IEEE Conference on Ultra Wideband Systems and Technologies, 2002, pp. 19-23.

[39] M. McClure, R. C. Qiu, and L. Carin, "On the super resolution identification of observables from swept-frequency scattering data," IEEE Trans. Antennas Propagat., vol. 45, no. 4, pp. 631-641, 1997. Systems and Technologies, 2002, pp. 19-23.

What is claimed is:

1. A method of estimating one-dimensional location information between two synchronized cognitive radio devices, the method comprising:

determining a required effective bandwidth to achieve a predetermined position accuracy, according to the equation:

$$\beta = \sqrt{\frac{v^2 M(d)}{K\gamma_s}}, \text{ where}$$

v is the velocity of a radio wave between the two cognitive radio devices,

M(d) is the position accuracy of the two cognitive radio devices,

K is the number of observation symbols in the radio wave, and $\gamma_s$ is the signal to noise ratio of the symbols; and transmitting a signal at the required effective bandwidth whereby the predetermined position accuracy is achieved to resolve location information between the two synchronized cognitive radio devices.

2. A method of estimating multi-dimensional location information between cognitive radio devices, the method comprising:

determining an effective bandwidth to achieve a predetermined position accuracy, according to the equation:

$$G(\beta, w, P(w)) = \frac{vM(d_i)}{K\gamma_s \alpha_i}, \text{ where}$$

v is the velocity of a radio wave between the cognitive radio devices, $M(d_i)$ is the position accuracy of the ith path between the cognitive radio devices, K is the number of symbols in the radio wave, $\gamma_s$ is the signal to noise ratio of the symbols, and
$\alpha_i$ is the amplitude of the ith path; and transmitting a signal at the required effective bandwidth whereby the predetermined position accuracy is achieved to resolve location information between the two synchronized cognitive radio devices.

3. A method of overlay enhanced dynamic spectrum (O-EDSM) in a cognitive positioning system, the method comprising:

determining if an exact effective bandwidth ($\beta$) is available for an overlay mode;

determining a relative bandwidth (B) using available bandwidth ($x_n$), responsive to the exact effective bandwidth being available for the overlay mode;

performing the following operations, responsive to the exact effective bandwidth not being available for the overlay mode:

determining a bandwidth error vector ($\rho_k$) for the overlay mode;

determining an effective bandwidth vector ($\tilde{\beta}_n$) for the overlay mode;

determining the corresponding available relative bandwidths ($\tilde{x}_n$) for the effective bandwidth vector ($\tilde{\beta}_n$); and determining the relative bandwidth (B) using the corresponding available relative bandwidths ($\tilde{x}_n$) and transmitting a signal in the cognitive positioning system at the relative bandwidth.

4. The method of claim 3, wherein the relative bandwidth (B) is determined according to the equation $$B = \left\{ x_{\hat{n}} \mid \hat{n} = \underset{n}{\operatorname{argmax}}(x_n) \right\},$$

where $x_n$ is the available bandwidth in the spectrum.

5. The method of claim 3, wherein the bandwidth error vector ($\rho_k$) for the overlay mode is determined according to the equation $\rho_k = |\tilde{\beta}_k - \beta|$ where $\tilde{\beta}_k$ is the k-element vector of available effective bandwidth ordered from low to high center frequency for a given time.

6. The method of claim 3, wherein the effective bandwidth vector ($\tilde{\beta}_n$) is determined according to the equation $$\tilde{\beta}_n = \left\{ \tilde{\beta}_{\hat{k}} \mid \hat{k} = \underset{n}{\operatorname{argmax}}(\rho_k) \right\},$$

where $\rho_k$ is the bandwidth error vector for the overlay mode.

7. A method of hybrid overlay and underlay enhanced dynamic spectrum (H-EDSM) in a cognitive positioning system, the method comprising:

determining a distance between two cognitive radio devices ($\tilde{d}$);

determining a threshold distance ($d_{th}$);

performing the following operations, responsive to the distance between the two cognitive radio devices ($\tilde{d}$) not being greater than the threshold distance ($d_{th}$) and responsive to the exact effective bandwidth ($\beta$) not being available in the overlay mode:

determining a bandwidth error vector ($\rho_k$) for the overlay mode;

determining a bandwidth error vector ($\rho_m$) for the underlay mode;

determining the minimum bandwidth error ($\rho_{min}$);

determining an effective bandwidth vector ($\tilde{\beta}_n$) for the mode that provides the minimum bandwidth error ($\rho_{min}$);

determining the corresponding available relative bandwidths ($\tilde{x}_n$) for the effective bandwidth vector ($\tilde{\beta}_n$); and determining the relative bandwidth (B) using the corresponding available relative bandwidths ($\tilde{x}_n$); and transmitting a signal in the cognitive positioning system at the relative bandwidth.

8. The method of claim 7, wherein the distance between the two cognitive radio devices ($\tilde{d}$) is determined according to the equation $$\tilde{d} = \left| 0.5 \left[ d_o + \sqrt{d_o^2 + \sqrt{\kappa}\, \frac{v d_o}{f\pi}} \right] \right|,$$

where $d_o$ is the Fresnel breakpoint distance, $\kappa$ is the instantaneous dynamic range of the receiving cognitive radio device, v is the velocity of a radio wave between the cognitive radio devices, and f is the velocity of a radio wave between the cognitive radio devices.

9. The method of claim 7, wherein the threshold distance ($d_{th}$) is determined according to the equation $$d_{th} = \left| 0.5 \left[ d_o + \sqrt{d_o^2 + \sqrt{\kappa_{\max}}\, \frac{v d_o}{f\pi}} \right] \right|,$$

where $d_o$ is the Fresnel breakpoint distance, $\kappa_{max}$ is the maximum instantaneous dynamic range of a receiving cognitive radio device, v is the velocity of a radio wave between the cognitive radio devices, and f is the velocity of a radio wave between the cognitive radio devices.

10. The method of claim 7, wherein the threshold distance ($d_{th}$) is the coverage radius that one of the cognitive radios can establish a link with the other cognitive radio at an acceptable QoS level.

11. The method of claim 7, wherein the bandwidth error vector ($\rho_k$) for the overlay mode is determined according to the equation $\rho_k = \tilde{\beta}_k - \beta \oplus$ where $\tilde{\beta}_k$ is the k-element vector of available effective bandwidth ordered from low to high center frequency for a given time.

12. The method of claim 7, wherein the bandwidth error vector ($\rho_m$) for the underlay mode is determined according to the equation $\rho_m = |\tilde{\beta}_m - \beta|\alpha$ where $\tilde{\beta}_m$ is the m-element vector of available effective bandwidth ordered from low to high center frequency for a given time.

13. The method of claim 7, wherein the minimum bandwidth error ($\rho_{min}$) is determined according to the equation $\rho_{min} = (\min(\rho_{min}), \min(\rho_k))$.

14. The method of claim 7, wherein the effective bandwidth vector ($\tilde{\beta}_n$) is determined according to the equation $$\tilde{\beta}_n = \left\{ \tilde{\beta}_q \mid \hat{q} = \underset{q}{\operatorname{argmin}}(\rho_q) \right\},$$

where $\rho_q$ is the minimum bandwidth error vector.

15. The method of claim 7, wherein the relative bandwidth (B) is determined according to the equation $$B = \left\{ x_{\hat{n}} \mid \hat{n} = \underset{n}{\operatorname{argmax}}(x_n) \right\},$$

where $x_n$ is the available bandwidth in the spectrum.

16. The method of claim 7, further comprising:
performing the following operation, responsive to the distance between the two cognitive radio devices ($\tilde{d}$) being greater than the threshold distance ($d_{th}$):
determining a bandwidth error vector ($\rho_k$) for the overlay mode;
determining an effective bandwidth vector ($\tilde{\beta}_n$) for the overlay mode;
determining the corresponding available relative bandwidths ($\tilde{x}_n$) for the effective bandwidth vector ($\tilde{\beta}_n$); and
determining the relative bandwidth (B) using the corresponding available relative bandwidths ($\tilde{x}_n$).

17. The method of claim 16, wherein the relative bandwidth (B) is determined according to the equation $$B = \left\{ x_{\hat{n}} \mid \hat{n} = \underset{n}{\operatorname{argmax}}(x_n) \right\},$$

where $x_n$ is the available bandwidth in the spectrum.

18. The method of claim 16, wherein the bandwidth error vector ($\rho_k$) for the overlay mode is determined according to the equation $\rho_k = |\tilde{\beta}_k - \beta|$ where $\tilde{\beta}_k$ is the k-element vector of available effective bandwidth ordered from low to high center frequency for a given time.

19. The method of claim 16, wherein the effective bandwidth vector ($\tilde{\beta}_n$) is determined according to the equation $$\tilde{\beta}_n = \left\{ \tilde{\beta}_{\hat{k}} \mid \hat{k} = \underset{k}{\operatorname{argmin}}(\rho_k) \right\},$$

where $\rho_k$ is the bandwidth error vector for the overlay mode.

20. The method of claim 7, further comprising:
determining a relative bandwidth (B) using available bandwidth ($x_n$), responsive to the distance between the two cognitive radio devices ($\tilde{d}$) not being greater than the threshold distance ($d_{th}$) and responsive to the exact effective bandwidth ($\beta$) being available in the overlay mode.

21. The method of claim 20, wherein the relative bandwidth (B) is determined according to the equation $$B = \left\{ x_{\hat{n}} \mid \hat{n} = \underset{n}{\operatorname{argmax}}(x_n) \right\},$$

where $x_n$ is the available bandwidth in the spectrum.

22. A cognitive radio device comprising:
a processor; and
a memory storage including instructions that cause the transmitting radio device to perform:
determining if an exact effective bandwidth ($\beta$) is available for an overlay mode;
determining a relative bandwidth (B) using available bandwidth ($x_n$), responsive to the exact effective bandwidth being available for the overlay mode;
performing the following operations, responsive to the exact effective bandwidth not being available for the overlay mode:
determining a bandwidth error vector ($\rho_k$) for the overlay mode;
determining an effective bandwidth vector ($\tilde{\beta}_n$) for the overlay mode;
determining the corresponding available relative bandwidths ($\tilde{x}_n$) for the effective bandwidth vector ($\tilde{\beta}_n$); and
determining the relative bandwidth (B) using the corresponding available relative bandwidths ($\tilde{x}_n$); and
transmitting a signal from the radio device at the relative bandwidth.

23. The cognitive radio device of claim 22, wherein the relative bandwidth (B) is determined according to the equation $$B = \left\{ x_{\hat{n}} \mid \hat{n} = \underset{n}{\operatorname{argmax}}(x_n) \right\},$$

where $x_n$ is the available bandwidth in the spectrum.

24. The cognitive radio device of claim 22, wherein the bandwidth error vector ($\rho_k$) for the overlay mode is determined according to the equation $\rho_k = |\tilde{\beta}_k - \beta|$ where $\tilde{\beta}_k$ is the k-element vector of available effective bandwidth ordered from low to high center frequency for a given time.

25. The cognitive radio device of claim 22, wherein the effective bandwidth vector ($\tilde{\beta}_n$) is determined according to the equation $$\tilde{\beta}_n = \left\{ \tilde{\beta}_{\hat{k}} \mid \hat{k} = \underset{k}{\operatorname{argmin}}(\rho_k) \right\},$$

where $\rho_k$ is the bandwidth error vector for the overlay mode.

26. A first cognitive radio device comprising:
a processor; and
a memory storage including instructions that cause the transmitting radio device to perform:
determining a distance between the first cognitive radio device and a second cognitive radio device ($\tilde{d}$);
determining a threshold distance ($d_{th}$);
performing the following operations, responsive to the distance between the first and second cognitive radio devices ($\tilde{d}$) not being greater than the threshold distance ($d_{th}$) and responsive to the exact effective bandwidth ($\beta$) not being available in the overlay mode:
determining a bandwidth error vector ($\rho_k$) for the overlay mode;
determining a bandwidth error vector ($\rho_m$) for the underlay mode;
determining the minimum bandwidth error ($\rho_{min}$);
determining an effective bandwidth vector ($\tilde{\beta}_n$) for the mode that provides the minimum bandwidth error ($\rho_{min}$);
determining the corresponding available relative bandwidths ($\tilde{x}_n$) for the effective bandwidth vector ($\tilde{\beta}_n$) and
determining the relative bandwidth (B) using the corresponding available relative bandwidths ($\tilde{x}_n$); and transmitting signals between the first and second cognitive radio devices at the relative bandwidth.

27. The first cognitive radio device of claim 26, wherein the distance between the first and second cognitive radio devices ($\tilde{d}$) is determined according to the equation $$\tilde{d} = \left| 0.5 \left[ d_o + \sqrt{d_o^2 + \sqrt{\kappa}\,\frac{v d_o}{f \pi}} \right] \right|,$$

where $d_o$ is the Fresnel breakpoint distance, $\kappa$ is the instantaneous dynamic range of the receiving, second cognitive radio device, $v$ is the velocity of a radio wave between the first and second cognitive radio devices, and $f$ is the velocity of a radio wave between the first and second cognitive radio devices.

28. The first cognitive radio device of claim 26, wherein the threshold distance ($d_{th}$) is determined according to the equation $$d_{th} = \left| 0.5 \left[ d_o + \sqrt{d_o^2 + \sqrt{\kappa_{\max}}\,\frac{v d_o}{f \pi}} \right] \right|,$$

where $d_o$ is the Fresnel breakpoint distance, $\kappa_{max}$ is the maximum instantaneous dynamic range of the second cognitive radio device, $v$ is the velocity of a radio wave between the first cognitive radio device and the second cognitive radio device, and $f$ is the velocity of a radio wave between the first cognitive radio device and the second cognitive radio device.

29. The first cognitive radio device of claim 26, wherein the threshold distance ($d_{th}$) is the coverage radius that the first cognitive radio device can establish a link with the second cognitive radio device at an acceptable QoS level.

30. The first cognitive radio device of claim 26, wherein the bandwidth error vector ($\rho_k$) for the overlay mode is determined according to the equation $\rho_k = |\tilde{\beta}_k - \beta|$ where $\tilde{\beta}_k$ is the k-element vector of available effective bandwidth ordered from low to high center frequency for a given time.

31. The first cognitive radio device of claim 26, wherein the bandwidth error vector ($\rho_m$) for the underlay mode is determined according to the equation $\rho_m = |\tilde{\beta}_m - \beta|$ where $\tilde{\beta}_m$ is the m-element vector of available effective bandwidth ordered from low to high center frequency for a given time.

32. The first cognitive radio device of claim 26, wherein the minimum bandwidth error ($\rho_{min}$) is determined according to the equation $\rho_{min} = (\min(\rho_m), \min(\rho_k))$.

33. The first cognitive radio device of claim 26, wherein the effective bandwidth vector ($\tilde{\beta}_n$) is determined according to the equation $$\tilde{\beta}_n = \left\{ \tilde{\beta}_q \,|\, \hat{q} = \operatorname*{argmin}_q(\rho_q) \right\},$$

where $\rho_q$ is the minimum bandwidth error vector.

34. The first cognitive radio device of claim 26, wherein the relative bandwidth (B) is determined according to the equation $$B = \left\{ x_{\hat{n}} \,|\, \hat{n} = \operatorname*{argmax}_n(x_n) \right\},$$

where $x_n$ is the available bandwidth in the spectrum.

35. The first cognitive radio device of claim 26, wherein the memory storage further includes instructions that cause the first cognitive radio device to perform the following operations, responsive to the distance between the first and second cognitive radio devices ($\tilde{d}$) being greater than the threshold distance ($d_{th}$):
  determining a bandwidth error vector ($\rho_k$) for the overlay mode;
  determining an effective bandwidth vector ($\tilde{\beta}_n$) for the overlay mode;
  determining the corresponding available relative bandwidths ($\tilde{x}_n$) for the effective bandwidth vector ($\tilde{\beta}_n$); and
  determining the relative bandwidth (B) using the corresponding available relative bandwidths ($\tilde{x}_n$).

36. The first cognitive radio device of claim 35, wherein the relative bandwidth (B) is determined according to the equation $$B = \left\{ x_{\hat{n}} \,|\, \hat{n} = \operatorname*{argmax}_n(x_n) \right\},$$

where $x_n$ is the available bandwidth in the spectrum.

37. The first cognitive radio device of claim 35, wherein the bandwidth error vector ($\rho_k$) for the overlay mode is determined according to the equation $\rho_k = |\tilde{\beta}_k - \beta|$ where $\tilde{\beta}_k$ is the k-element vector of available effective bandwidth ordered from low to high center frequency for a given time.

38. The first cognitive radio device of claim 35, wherein the effective bandwidth vector ($\tilde{\beta}_n$) is determined according to the equation $$\tilde{\beta}_n = \left\{ \tilde{\beta}_{\hat{k}} \,|\, \hat{k} = \operatorname*{argmin}_k(\rho_k) \right\},$$

where $\rho_k$ is the bandwidth error vector for the overlay mode.

39. The first cognitive radio device of claim 26, wherein the memory storage further includes instructions that cause the first cognitive radio device to perform:
  determining a relative bandwidth (B) using available bandwidth ($x_n$), responsive to the distance between the first and second cognitive radio devices ($\tilde{d}$) not being greater than the threshold distance ($d_{th}$) and responsive to the exact effective bandwidth ($\beta$) being available in the overlay mode.

40. The first cognitive radio device of claim 39, wherein the relative bandwidth (B) is determined according to the equation $$B = \left\{ x_{\hat{n}} \,|\, \hat{n} = \operatorname*{argmax}_n(x_n) \right\},$$

where $x_n$ is the available bandwidth in the spectrum.

* * * * *